March 11, 1952     J. G. ALLEN     2,588,456
SPRING SUSPENSION OF PERAMBULATORS AND THE LIKE
Filed Aug. 30, 1949
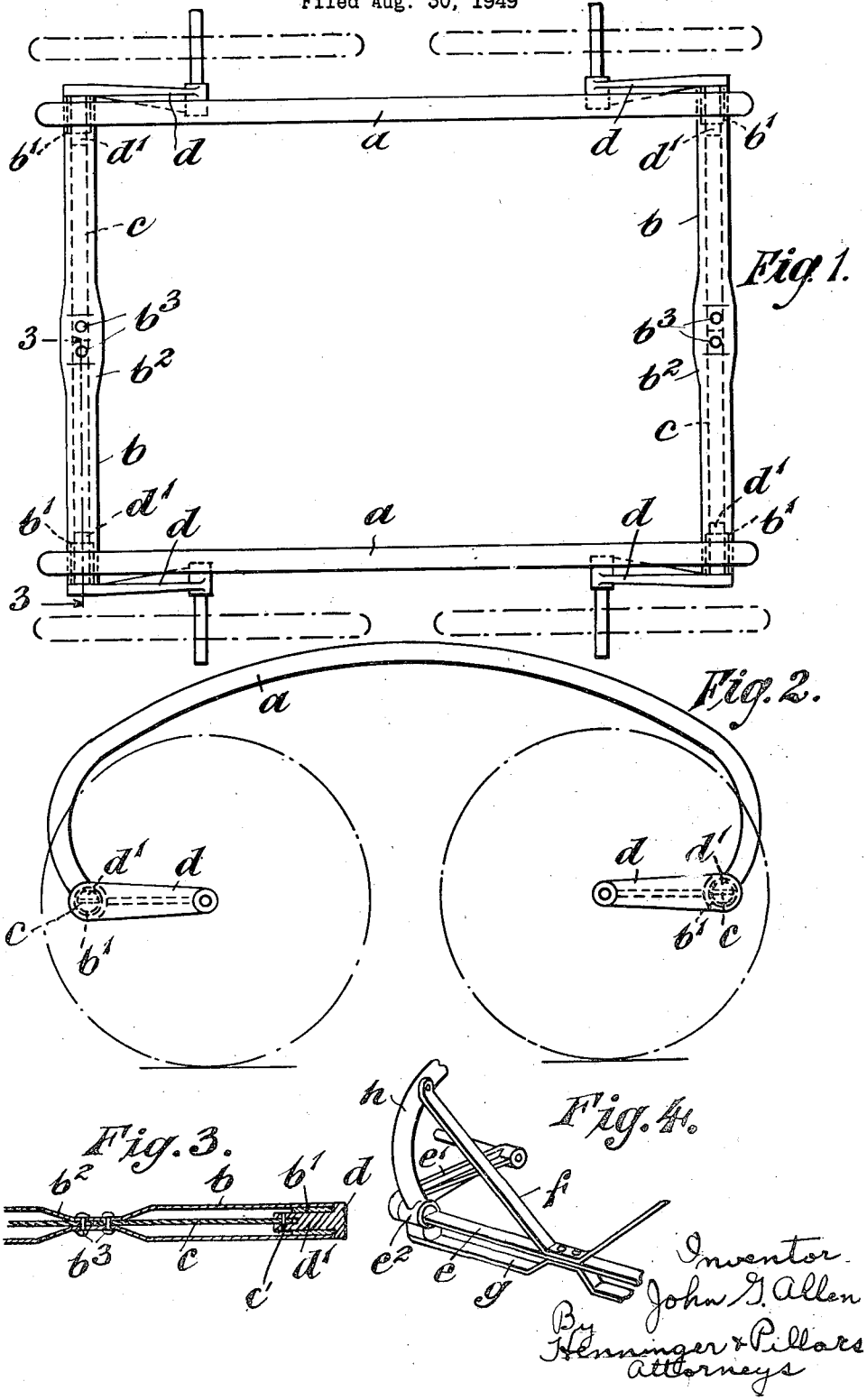

Patented Mar. 11, 1952

2,588,456

UNITED STATES PATENT OFFICE 2,588,456

SPRING SUSPENSION OF PERAMBULATORS
AND THE LIKE

John Griffin Allen, Hagley, near Stourbridge,
England

Application August 30, 1949, Serial No. 113,139
In Great Britain February 24, 1948

2 Claims. (Cl. 267—5)

1

The present invention has relation to the spring suspension of perambulators and the like, and has for its object to provide a spring suspension which is of simple construction and particularly efficient action.

According to the present invention the wheel axle is carried by a pivotal radius arm or lever, the oscillatory movement of which is controlled by an elongated steel torque blade or rod fixedly disposed transversely of the vehicle frame being rigidly attached at or about its extremity to the radius arm or lever at its fulcrum point whereby a controlled movement of the arm or lever is permitted which is determined by the torsional or twisting stress to which the steel blade or rod is subjected.

Advantageously one or two steel blades are accommodated in a transverse tubular casing, the blade or blades being secured thereto centrally of the vehicle and the radius arms secured to the outer extremities of the blade or blades and adapted to rotate in relation to the extremities of the casing.

This mechanism may be duplicated on the frame the radius arms or levers projecting forwardly and rearwardly of the perambulator giving independent wheel springing.

In order that this invention may be clearly understood and readily carried into practice reference may be had to the appended drawings, upon which:

Fig. 1 illustrates in plan view a perambulator chassis having spring suspension constructed according to the present invention.

Fig. 2 illustrates the chassis and suspension in elevation.

Fig. 3 is a fragmentary longitudinal sectional elevation taken on line 3—3 of Fig. 1, and Fig. 4 illustrates in fragmentary perspective a modified spring suspension.

In a convenient embodiment of the present invention the chassis is constructed primarily from two arch-shaped side members $a$ the lower extremities of the limbs of which are connected by cross tubes $b$. These cross tubes $b$ form the housings for the torsional blade springs $c$, see particularly Fig. 3, and the inwardly and horizontally directed radius arms $d$ associated therewith fulcrum within extremities of the tubes $b$. Advantageously each radius arm $d$, see Fig. 3, is provided with a lateral bearing member $d^1$ which is adapted to rotate in a bearing sleeve $b^1$ fixed in the extremity of the transverse tubing $b$ and this bearing member $d^1$ at its inner extremity is slotted for the reception of the ex-

2 tremity of the torsional blade spring $c$ which is riveted thereto at $c^1$. The inner extremity of the blade spring $c$ is secured to the tube by flattening the latter at $b^2$ in combination with a riveting operation $b^3$ and two separate torsional blade springs $c$ may be accommodated in one and the same tube $b$, the extremities lying adjacent the centre of the tube $b$ as shown or one blade spring $c$ may be employed through the tube, the bearings $d^1$ of the radius arms $d$ being appropriately attached to its extremities so that they rotate within or without the cross tube $b$. By the utilisation of this tube $b$ it will be appreciated that the blade spring $c$ is protected from the elements and a nipple or nipples or oil cups, not shown, may be provided at any advantageous position for admitting grease or oil into the interior of the device.

In a modification of the present invention, see Fig. 4, the blade spring $c$ may be clinched centrally between two frame parts $f$ and $g$ of the perambulator and inwardly facing substantially horizontally directed radius arms $e^1$ may be attached to the extremities of the blades, the said radius arms having for their fulcrum points bearings $e^2$ in the main side members $h$ of the frame, the desideratum being that the wheels shall oscillate in relation to the frame under the control of the transverse torsional blade $e$ secured to the said frame $f$, $g$.

A perambulator chassis or frame constructed according to the present invention is particularly efficient and resilient in use, avoids the use of unsightly coiled springs, is of neat appearance, inexpensive to produce and can be readily assembled, the assembly lending itself to mass-production. Further it is to be noted that independent wheel springing is provided of a readily responsive character giving comfort to the occupant of the perambulator and satisfaction to the person propelling the said perambulator.

I claim:

1. In a spring suspension system for a perambulator or the like, the combination comprising, a frame for said perambulator provided with a transversely disposed tubular casing, said tubular casing formed with a flattened portion position intermediate its ends and centrally of the casing, a radius arm rotatively mounted at an end of said tubular casing, a torsional member disposed within said tubular casing and secured to said casing within said flattened portion by fastening means extending through said casing and said member, and connecting means for rigidly securing an end of said torsional member to said radius arm whereby rotative movement of said radius arm is opposed by the torsional stress of said member.

2. In a spring suspension system for a perambulator or the like, the combination comprising, a frame for said perambulator provided with a transversely disposed tubular casing, said tubular casing formed with a flattened portion positioned intermediate its ends and centrally of the casing, a plurality of radius arms, mounting means for rotatively supporting one of said radius arms at each end of said tubular casing, an elongated torsional member disposed within said casing and rigidly secured at each of its extremities to said radius arms, and securing means passing through said flattened portion of said casing and said torsional member whereby rotative movement of said radius arms is opposed by the torsional stress of said member.

JOHN GRIFFIN ALLEN.

REFERENCES CITED

The following references are of record in the file of this patent:

UNITED STATES PATENTS

| Number | Name | Date |
| --- | --- | --- |
| 2,175,562 | Frohlich | Oct. 10, 1939 |

FOREIGN PATENTS

| Number | Country | Date |
| --- | --- | --- |
| 756,731 | France | Sept. 25, 1933 |
| 807,282 | France | Oct. 12, 1936 |